United States Patent
Hojjatie et al.

(10) Patent No.: US 7,914,763 B1
(45) Date of Patent: Mar. 29, 2011

(54) PROCESS AND APPARATUS FOR PREPARING MANGANESE THIOSULFATE (MNTS) SOLUTION

(75) Inventors: Michael Massoud Hojjatie, Tucson, AZ (US); Constance Lynn Frank Lockhart, Tucson, AZ (US); Thomas D. Fairweather, Dundee, OR (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 0 days.

(21) Appl. No.: 12/705,953

(22) Filed: Feb. 15, 2010

(51) Int. Cl.
*C01B 17/64* (2006.01)

(52) U.S. Cl. .............................. 423/514; 504/188; 71/63

(58) Field of Classification Search .................. 423/514; 504/188; 71/63
See application file for complete search history.

(56) References Cited

U.S. PATENT DOCUMENTS

| 528,162 | A | 10/1894 | Heinzerling |
| 1,855,856 | A | 4/1932 | Hansen |
| 6,921,523 | B2 * | 7/2005 | Hojjatie et al. ............... 423/514 |

FOREIGN PATENT DOCUMENTS

GB 00511877 8/1938

OTHER PUBLICATIONS

Kvasha, V. et al., "Use of whole milk replacer in calf raising", Molochnoe i Myasnoe Skotovodstvo, 1:33-35 (1991).

* cited by examiner

*Primary Examiner* — Timothy C Vanoy
(74) *Attorney, Agent, or Firm* — Fennemore Craig, P.C.

(57) ABSTRACT

An efficient semi-continuous preparation of manganese thiosulfate ($MnS_2O_3$, MnTS) from manganese hydrosulfite and sulfur at elevated temperature is described. Manganese hydrosulfite is prepared from commercial manganese carbonate and sulfur dioxide. The resulting product is an emulation of liquid manganese thiosulfate and solid by-products. A manganese thiosulfate solution is produced according to the invention by use of certain mole ratios of $MgCO_3$ to sulfur, and certain parameters such as the temperature of the reaction process and the pH conditions, including rate and duration of $SO_2$ purging, which causes the by-products to be reduced to less than 2% by weight. The resulting manganese thiosulfate is a pinkish liquid with concentration up to 20%.

16 Claims, 10 Drawing Sheets

Figure 1. Kinetics of $MnS_2O_3$ Reaction for Mole Ratio $MnCO_3$ = 1.00, 1.05, 1.10:1.00 $SO_2$:1.20 S □ $MnCO_3$ = 1.00  ● $MnCO_3$ = 1.05  ○ $MnCO_3$ = 1.10

Figure 3. Objective Concentration of MnTS (per Raw Materials) versus Weight of Solid and Percent of Solid (per Raw Materials)

Figure 5. Residual Solids for Manganese Thiosulfate Reactions, Using Raw Materials for Projected Concentrations 15-20%, Sulfur Source = Tire sulfur or Industrial sulfur Figure 6. Progress of Manganese Thiosulfate Reaction 15 to 20% Objective Concentration Figure 7. Objective Concentration of MnTS Products versus Residual Solid

PROCESS AND APPARATUS FOR PREPARING MANGANESE THIOSULFATE (MNTS) SOLUTION

FIELD OF THE INVENTION

The present invention is directed to plant nutrient solutions, and more particularly, to plant nutrient solutions containing manganese thiosulfate.

DESCRIPTION OF RELATED ART

The thiosulfate ion, $S_2O_3^{2-}$, is a structural analogue of the $SO_4^{2-}$ ion in which one oxygen atom is replaced by one S atom. However, the two sulfur atoms in $S_2O_3^{-2}$ are not equivalent. One of the S atoms is a sulfide-like sulfur atom that gives the thiosulfate its reducing properties and complexing abilities.

Thiosulfates are used in leather tanning, paper and textile manufacturing, flue-gas desulfurization, cement additives, dechlorination, ozone and hydrogen peroxide quenching, coating stabilizers and so on.

Due to the complex-forming abilities with metals, thiosulfate compounds have been used in commercial applications such as photography, waste treatment and water treatment applications.

Thiosulfates readily oxidize to dithionate, then tetrathionate and finally to sulfates:

Due to this transformation, thiosulfates are used as fertilizers in combinations with cations such as ammonium, potassium, magnesium and calcium. The ammonium, alkali metal and alkaline earth thiosulfates are soluble in water. Water solubilities of thiosulfates decrease from ammonium to alkali metals to alkaline earth thiosulfates.

Manganese is an important element found as a free element in nature (often in combination with iron), and in many minerals. Manganese is referred to herein as both "manganese" and "Mn". The free element is a metal with important industrial metal alloy uses. Manganese (II) ions function as cofactors for a number of enzymes; the element is thus a required trace mineral for all known living organisms. It is used as a nutrient for animals and plants, for example in food supplements for animals and in fertilizers for plants.

Manganese is important in photosynthetic oxygen evolution in the chloroplasts in plants, which are also evolutionarily of bacterial origin. The oxygen evolving complex, a water-oxidizing enzyme contained in the chloroplast membrane, which is involved in the terminal photooxidation of water during the reactions of photosynthesis, has a metallocoenzyme core containing four atoms of manganese (G. Charles Dismukes, and Rogier T. van Willigen, *Encyclopedia of Inorganic Chemistry*, Wiley InterScience, 2008). For this reason, most broad-spectrum plant fertilizers contain manganese.

Manganese deficiency symptoms vary among crop species. In soybeans, manganese deficiency is widespread. It first takes the form of lightening of the green color of the leaves, which gradually turn yellow. Manganese deficiency is widespread in tomatoes as well, whether grown in greenhouses or in the field. It manifests itself first as a lightening of the green color in the interveinal area of the leaves, which gradually turns yellow. In eggplant, Mn deficiency is common in soils with high pH, and in highly oxidized soil conditions such as dry soil with a low level of organic matter. Manganese deficiencies have been observed for watermelon, grape, passion fruit, citrus, tea, mulberry, and most other crops.

Manganese deficiencies also occur in trees. This usually happens in the soil with high alkaline pH. Manganese deficiency occurs in apple orchards planted on calcareous soils. Growers often apply foliar Mn when tissue analysis indicates low levels or when tree growth is poor due to low soil levels. Nursery growers have reported manganese deficiencies in silver fir trees. Mn deficiency has been observed in avocado trees, peach trees, red maple trees, and palm trees. Soil samples from grass seed fields in recent years have indicated that levels of manganese have been dropping. At planting, growers typically spray a solution of manganese sulfate ($MnSO_4$) once a week. Older fields, however, are running short and supplemental applications are necessary.

Plants can absorb manganese only when it occurs in solution as a divalent cation ($Mn^{2+}$). $Mn^{2+}$ is referred to as the reduced form. Mn also occurs in oxidized forms ($Mn^{3+}$ and $Mn^{4+}$), both of which are unavailable for plant uptake. Soil microorganisms oxidize $Mn^{2+}$ to $Mn^{3+}$, which makes it unavailable to plants. This biological reaction occurs slowly when soil pH is between 5 and 6.5. However, it proceeds more rapidly as pH increases up to 7.5 (Russell E. W., *Soil Conditions and Plant Growth*, 11$^{th}$ edition, Longman Scientific & Technical, Essex, England, 1988).

The form of manganese in a soil system depends largely on the functioning of soil microorganisms, and their activity depends on soil pH. Manganese can be reduced (from $Mn^{3+}$ to $Mn^{2+}$), making it available to plants, either chemically or by other soil microorganisms that function more efficiently at low pH (Russell, 1988). Increased Mn reduction to $Mn^{2+}$ also can result from the action of materials secreted by plant roots. These secretions are solutes that aid in nutrient acquisition, increase root tolerance to high concentrations of aluminum, and/or act as a lubricant as roots grow through soil. The organic acids contained in root exudates, particularly malic acid, increase the solubility of Mn in the soil, making it more available to plants. Attachment of $Mn^{2+}$ to organic compounds in root exudates (chelation) prevents the $Mn^{2+}$ from reoxidizing to the unavailable form (J. Atland, North Willamette Research and Extension Center, Oregon State University, 2006).

Manganese (Mn) is relatively immobile in soil. Therefore, Mn applied to the soil surface will remain at the surface. To alter soil Mn levels and prevent Mn deficiency, Mn must be distributed throughout the root zone so that all roots can intercept and absorb it. Plants have a vascular system for moving water, metabolites, and solutes from one part to another. The plant vascular system consists of two components, xylem and phloem. Xylem transports water and dissolved nutrients from roots upward to shoots, with virtually no downward movement. Phloem transports water, metabolites, and solutes in all directions throughout the plant. Mn is absorbed by roots and moved upward to the leaves through the xylem; however, Mn cannot be transported through the phloem. Therefore, Mn accumulated in leaves cannot be remobilized in any significant quantity (Graham, R. D., Hannan, R. J., and Uren, N. C., *Manganese in Soil and Plants*, Kluwe Academic Publishers, Boston, Mass., 1988).

Similarly, Mn absorbed by foliage directly via foliar sprays will not move out of the foliage and back into stem or root tissue. While foliage can be made to look more green and healthy with supplemental foliar-applied Mn, root systems on those plants will still be deficient. Likewise, Mn absorbed by one root cannot be redistributed to another part of the root system (Nable, R. O., and Loneragan, J. F., "Translocation of Manganese in Subterranean Clover", *Aust. J. Plant Physiol.,* 11, 113-118, 1984).

Manganese plays four major roles in plant growth and development. It is involved in the plant's ability to capture light energy for use in photosynthesis. In nitrogen (N) metabolism, it plays a role in the conversion of nitrate to ammonium, probably through interaction with an enzyme known as nitrate reductase (Marschner, H., *Mineral Nutrition of Higher Plants, 2$^{nd}$* edition, Academic Press, Inc., San Diego, Calif., 1997). Critical to production of nursery crops is the role of Mn as a precursor to the plant hormone auxin. Mn activates the auxin oxidase system (Russell, *Soil Conditions and Plant Growth,* 11$^{th}$ edition, Longman Scientific & Technical, Essex, England, 1988)). Mn deficiency reduces auxin levels and causes hormone imbalance. A decrease in the ratio of auxin to other plant hormones causes reduced lateral root development and root extension (Landis, T. D., and van Steenis, E., "Micronutrients-Manganese", *Forest Nursery Notes,* Winter: 8-12, 1998). Finally, Mn plays a vital role in carbohydrate production. Carbohydrates are molecules containing carbon, hydrogen, and oxygen that are used by plants for energy storage. An abundant supply of carbohydrates is produced in leaves through photosynthesis. These carbohydrates can be used locally to fuel cellular processes within the leaf, or they can be shuttled to other parts of the plant to be used as an energy source. During the winter when plants are dormant, carbohydrates are stored in stem and root tissue. Stored carbohydrates in the root system are important for root regeneration the following year. Mn deficiency reduces the plant's ability to produce carbohydrates, thus reducing a harvested plant's ability to regenerate roots and grow vigorously when replanted the following year. Growers must manage soil pH in order to improve Mn availability for plants. For example, for the red maple, growers raise or lower the soil pH to the target level of 5.0 to 5.6.

The most common carriers of Mn (II) are manganese sulfate, $MnSO_4$, manganese carbonate, $MnCO_3$, and manganese chloride, $MnCl_2$. These sources of Mn (II) plant nutrients are all in solid forms. One has to pre-dissolve these to make a proper solution. Dusting is a problem using these materials. Solubility values in water and the respective pH values of these sources of Mn plant nutrient are listed in the following Table 1.

TABLE 1

Solubility (in 100 g water @ 25° C.) and respective pH of some Manganese Compounds

| Compound | Solubility | pH |
|---|---|---|
| $MnCl_2$ | 77.3 | 6.9 |
| $MnCO_3$ | 0.00008 | 6.4 |
| $MnSO_4$ | 63.7 | 2.8 |

A key point in manganese (Mn) availability in soil depends primarily on soil pH. Mn is not mobile in soil; it must be incorporated into soil prior to planting. Mn moves from plant roots to foliage but is otherwise immobile in plants. It must be available to plant roots, where it can be absorbed and distributed throughout the plant. Mn deficiency must be prevented with management practices prior to planting.

Having soil with adequately low soil pH and/or adjusting the soil pH prior to planting is very important in avoiding manganese deficiency. Minimum pH of 5.0 and maximum pH of 5.7 has been recommended for efficient Mn uptake by many crops and trees (Atland, J., *Oregon State Extension Service Report,* March 2006). The above three common sources ($MnSO_4$, $MnCO_3$, and $MnCl_2$) of Mn plant nutrient are solids. The solubility of manganese carbonate is very low. While the solubility of manganese chloride and manganese sulfate are high, their solution pH values are higher than recommended pH for efficient Mn uptake by plants.

Manganese thiosulfate, also referred to herein as "MnTS", is a liquid source of Mn with up to 20% concentration. The advantage of this material is that it is a high concentration source of Mn(II) in the liquid form which could be used with ease without premixing, while avoiding the generation of hazardous dust. A solution of manganese thiosulfate has pH of 5-6 at 25° C. Its liquid form and its proper pH characteristics make this source of Mn a very unique product.

Surprisingly, a viable commercial approach to the production of manganese thiosulfate is not described in the literature.

Kvasha, V., Vasillishin, N., Krivonos, V., and Kmita, I. in *Ukrainan Dairy Science Journal,* 1991 has mentioned the use of "manganese thiosulphate" as a component of milk replacer in calf-raising. No source of "manganese thiosulphate" is mentioned. Patent Application No.: 957638/02, GB-A, 1938, discusses a process for obtaining approximately pure manganese compounds by treating manganese containing initial substances that have been roasted to their oxide form $MnO_2$ with sulfur dioxide to produce manganese dithionate and manganese sulfate at high temperature.

The present invention relates to an efficient and cost-effective process for preparing manganese thiosulfate solutions. The present invention further relates to the production of high concentration manganese thiosulfate product solutions which utilize relatively inexpensive starting materials and form low by-products.

SUMMARY OF THE INVENTION

One aspect of the present invention is directed to a process for preparing manganese thiosulfate using manganese carbonate, $MgCO_3$, sulfur dioxide, and sulfur as starting materials. The process comprises providing a manganese hydrosulfite slurry. Sulfur dioxide is purged into a solution of manganese carbonate to produce a slurry of manganese hydrosulfite and manganese carbonate mixture. Carbon dioxide forms as gaseous product. The reaction mixture is heated. Sulfur is then added to the mixture and reacted under conditions sufficient to form manganese thiosulfate, and manganese thiosulfate is recovered.

Liquid solutions containing high concentration of manganese thiosulfate can be prepared having only minimal quantities of solid byproducts. The solid byproducts optionally can be recycled in the batch for further use. The byproduct waste consists of unreacted excess manganese carbonate, sulfur, and insoluble impurities in the commercial raw material $MnCO_3$. The conditions for reaction of manganese carbonate with sulfur dioxide and sulfur, e.g., mole ratios, pH, time and temperature, preferably are selected to minimize the amount of by-products and increase the yield of product, manganese thiosulfate.

In accordance with another aspect of the invention, a manganese thiosulfate solution comprises an aqueous medium containing at least about 20 wt % $MnS_2O_3$, up to about 7 wt % sulfur, and up to about 6 wt % Mn. The pH of said solution is about 5-6 at 25° C. The solid by-products present in the process preferably are less than 2% by weight.

BRIEF DESCRIPTION OF THE DRAWINGS

The present invention will now be described in more detail reference to preferred embodiments of the invention, given only by the way of example, and illustration in the accompanying drawings in which.

DETAILED DESCRIPTION OF THE INVENTION

The process of the present invention is described herein as proceeding according the following reaction pathway:

$$2MgCO_3 + 2SO_2 + H_2O \rightarrow Mn(HSO_3)_2 + MnCO_3 + CO_2(g) \quad (1)$$

$$Mn(HSO_3)_2 + MnCO_3 + 2S \rightarrow 2MnS_2O_3 + H_2O + CO_2(g) \quad (2)$$

Reaction (1) involves synthesis of $Mn(HSO_3)_2$ intermediate. The intermediate is a slurry, which typically includes a mixture of $Mn(HSO_3)_2/MnCO_3$ in both solution and solid state. For convenience, the intermediate is referred to herein as manganese hydrosulfite, $Mn(HSO_3)_2$ or MnHS, because this is the predominant species that has been measured in the solution. Reaction (2) involves the utilization of this intermediate for preparation of magnesium thiosulfate product. As shown above, the total stoichiometric reaction generates one mole of water and two moles of carbon dioxide for every two moles of manganese thiosulfate generated.

Unless otherwise cleared from the context, all percentages set forth herein refer to percentages by weight.

Figure 10:
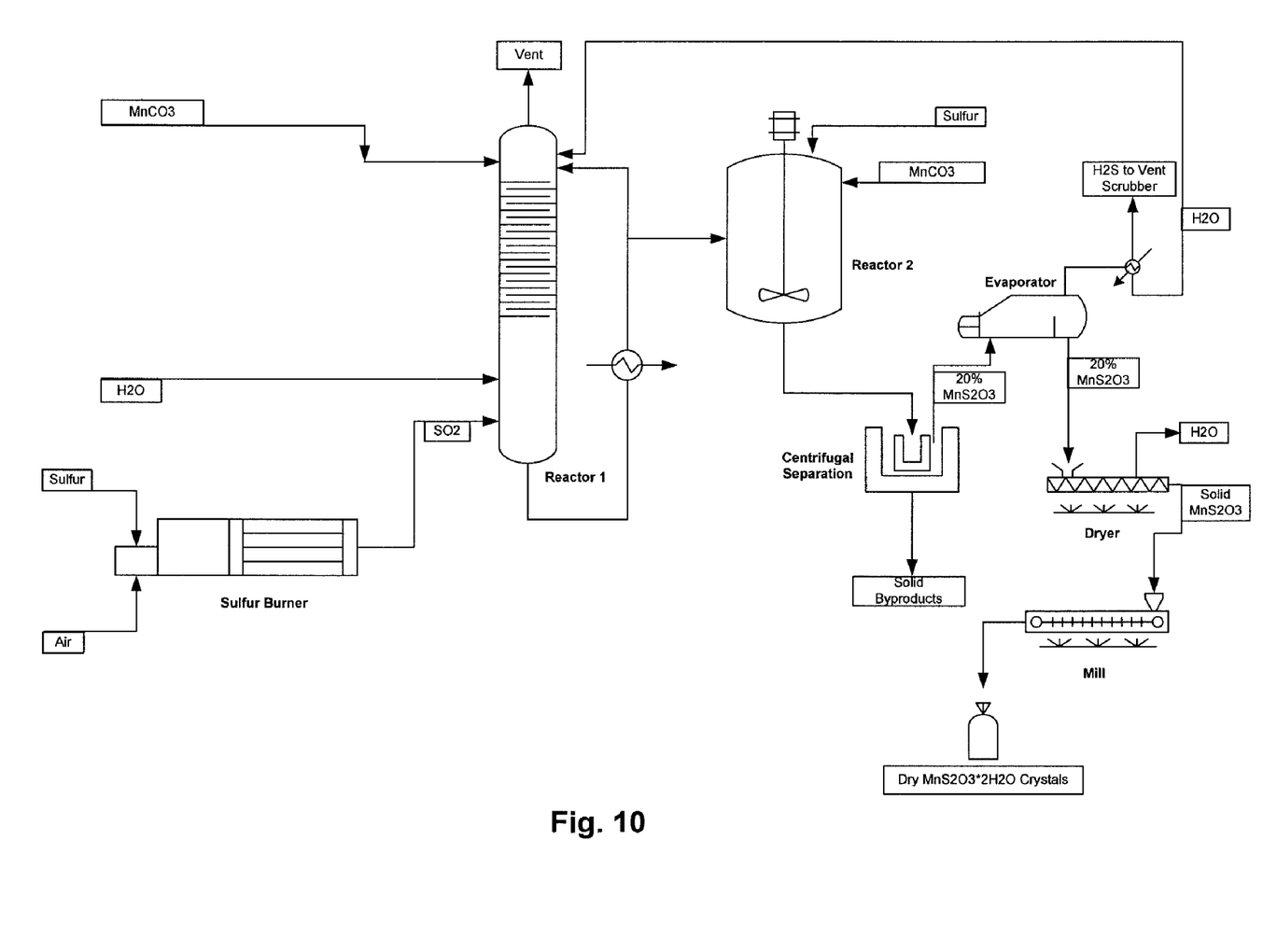
FIG. 10 is schematic illustration of equipment and flow, according to one embodiment of the present invention.

With reference to FIG. 10, the first step of the synthesis, reaction (1), involves the synthesis of manganese hydrosulfite. Magnesium carbonate, $MnCO_3$, is charged into the reactor. Water is charged into the reactor at a volume consistent with the objective product concentration.

Effective agitation is applied to the $MnCO_3$ slurry and throughout the process. $SO_2$ preferably is purged into the $MnCO_3$ slurry to adjust the pH to about 2 to 3. Because the purging process generates heat, external energy application generally is not necessary at this stage of the process.

For the purpose of the calculation of the quantities of other raw materials, the mole ratio of sulfur dioxide is taken as 1. In addition, raw material amounts are adjusted relative to their purity. New raw material (e.g., $MnCO_3$ and S) are also reduced, accordingly, relative to the amount of recycled residual solids produced in the process.

The $Mn(HSO_3)_2$ product is a light slurry. The solubility of this intermediate is dependent on such factors as the initial manganese carbonate concentration, product pH and temperature. The solid quantity of the slurry increases with increasing pH.

Reaction (2) involves the conversion of $Mn(HSO_3)_2$ to $MnS_2O_3$. The prescribed quantity of S is charged into the reactor. Sufficient external heating is applied to bring the reaction solution to temperature of about 96 to about 99° C. (205-210° F.). Heat application preferably is restricted to the minimum required to achieve the prescribed temperature range. When the applied heat (temperature) is too intense, the reaction temperature will not change significantly. However, an increase in the applied heat will increase solution evaporation. Evaporation can be deleterious to the reaction, particularly until the poorly soluble $Mn(HSO_3)_2$ has been converted to manganese thiosulfate.

Once within the temperature range of about 96-99° C. (205-210° F.), the reaction is continued, with agitation, until the conversion to $MnS_2O_3$ is complete. Reaction kinetics was demonstrated to be raw material dependent.

Reaction can be conducted at lower temperatures; however, for a 5-10° C. (40-50° F.) decrease in temperature, the reaction time increases from 4-8 hours to 10-12 hours.

Reaction is conducted for 4-8 hours at 96-99° C. (205-210° F.) or until all intermediate $Mn(HSO_3)_2$ has been reacted out. The bulk of the reaction occurs during the $1^{st}$ two hours of the process.

Reaction can be conducted for product concentrations, efficiently, up to about 19% MnTS by weight. The optimum reaction is for 15% MnTS, as far as utilizing raw materials. The kinetics of the reaction are improved when raw materials are increased, up to those consistent with a 19% product, at the expense of more residual solids. (15-19% MnTS corresponds to 4.9-6.2% Mn and 5.8-7.3% S.)

The conversion of $Mn(HSO_3)_2$ to $MnS_2O_3$ occurs in the slurry state. The consistency of the slurry thins as the reaction proceeds. The pH is preferably maintained from about 4-6 during reaction (2), by adding incremental amounts of $MnCO_3$.

The purity of raw material, e.g., manganese carbonate and sulfur, influence the concentration of the manganese thiosulfate product and the amount of the residual solid byproduct. Using reagent grade $MnCO_3$ and tire grade S raw materials, residual solids range from 0.5% of raw material weight for a 15% product to 2% of raw material weight for an 18% product.

In order to determine the solubility of manganese thiosulfate (MnTS), MnTS was prepared by salt exchange of $MnSO_4$ with calcium thiosulfate, and was evaporated to the point of crystal formation. A saturated solution of MnTS measured 5.85% Mn (~17% MnTS).

In order to evaluate the proper raw material for production of MnTS from Mn ($HSO_3$), a series of reactions were conducted. The intermediate was prepared by purging $SO_2$ into either $Mn(OH)_2$ or $MnCO_3$. All $MnO/MnCO_3$ raw materials were added to water at the initiation of the reaction. Temperature increased to 40-45° C. during $SO_2$ purging. An indication the process was complete was the decline in slurry temperature. MnTS reactions were conducted at 96° C. Results showed MnCO$_3$ was more suitable for preparation of the objective MnTS concentration. Data appears in Table 2.

TABLE 2

Synthesis of MnTS

| RX ID | I | II | III | IV |
|---|---|---|---|---|
| Objective MnTS Concentration (wt %) | 10 | 10 | 15 | 15 |
| Mn source | MnO | MnCO$_3$ | MnCO$_3$ | MnCO$_3$ |
| Excess MnO/MnCO$_3$ | 0 | 0 | 0 | 10% |
| Initial pH Mn(OH)$_2$/MnCO$_3$ Slurry | 6.56 | 6.66 | 6.50 | 6.43 |
| Final pH of Mn(HSO$_3$)$_2$ Slurry | 2.60 | 2.24 | 1.95 | 1.99 |
| Excess S | 20% | 30% | 20% | 20% |
| Time of Thiosulfate Reactions (hrs) | 10 | 7 | 8 | 7 |
| Final Assay - MnTS (wt %) | 7.05 | 8.66 | 13.85 | 15.34 |
| Residual Solids (% of Raw Materials) | 4 | 0.9 | 0.8 | 1.6 |
| Comments | MnO/Mn(OH)$_2$ is extremely insoluble, even at low pH | MnCO$_3$ is more soluble. Final assay is low. | Assay is still low, but reaction shows that concentration can be elevated by the addition of more MnCO$_3$ | Assay is at objective concentration. Residual solids increase slightly from adding excess MnCO$_3$ |

The solubility of MnTS was determined by measuring the amount of solid, generated through the evaporation of MnTS solution that could be dissolved back into aqueous solution at ambient temperature. Maximum solubility was determined to be about 17-18%, as calculated from Mn concentration. We sought to optimize MnTS solution through the reaction process:

$$2MnCO_3 + 2SO_2 + H_2O \rightarrow Mn(HSO_3)_2 + MnCO_3 + CO_2 \quad (1)$$

$$Mn(HSO_3)_2 + MnCO_3 + 2S \rightarrow 2MnS_2O_3 + H_2O + CO_2 \quad (2)$$

It has been determined that excess S and MnCO$_3$ should be used in the raw materials to optimize product concentration and process kinetics. In one reaction, the mole ratio of raw materials was 1.05:1.00:1.20 MnCO$_3$:SO$_2$:S, with the relative moles of SO$_2$ taken to be 1 for calculation of S and MnCO$_3$ raw materials. SO$_2$ was added until pH stopped decreasing, temperature started dropping and the Mn(HSO$_3$)$_2$ product was almost entirely in solution (i.e., dissolved). Raw materials used were:
65.10 gm MnCO$_3$
499.8 gm H$_2$O
SO$_2$ to pH ~1.8 (from initial 6.36), temp=42° C.
21.37 gm S Progress of the associated thiosulfate process follows in Table 3.

TABLE 3

Progress of MnTS Preparation

| Time (hr, min) | pH | Temperature (° C.) | Wt % Alkalinity as Mn(OH)$_2$ | Wt % Mn(HSO$_3$)$_2$ | Wt % Mn(S$_2$O$_3$) |
|---|---|---|---|---|---|
| 0, 0 | 4.40 | 96 | | | |
| 0, 41 | 4.51 | 96 | | | |
| 2, 08 | 4.73 | 96 | 0 | 0.35 | 11.25 |
| 4, 04 | 4.89 | 96 | 0.04 | 0.27 | 13.37 |
| 6, 00 | 4.86 | 96 | 0 | 0.15 | 14.24 |
| 8, 00 | 4.89 | 96 | 0 | 0.20 | 14.77 |
| 9, 58 | 4.89 | 96 | 0 | 0.16 | 15.09 |

The products of this reactions consisted of 570.1 gm of filtrate and 3.7 gm of solid. The filtrate measured 14.89% MnTS, 0.06% alkalinity as Mn(OH)$_2$, 0 MnHS, 4.88% Mn, specific gravity=1.156@ 24° C. and pH=4.93.

Figure 1:
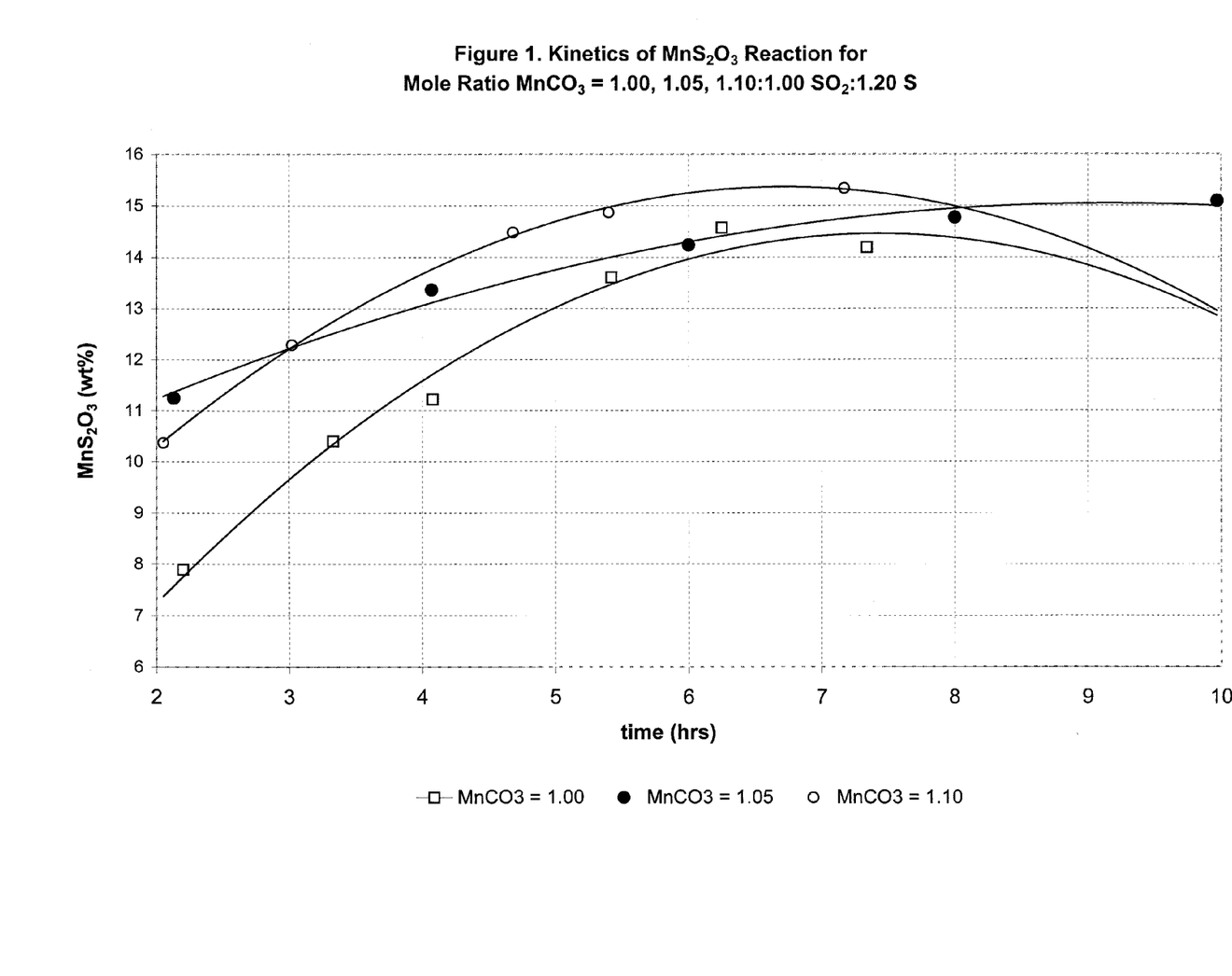
FIG. 1 is a graphical illustration of the reaction kinetics of $MnS_2O_3$ reaction for mole ratios of $MnCO_3$=1.00, 1.05, 1.10:1.00 $SO_2$:1.20 S.

MnTS cannot be made at high concentrations by simply adjusting the mole ratios of the raw materials (the reactants), as the following illustrates. Reaction kinetics with variation of objective product concentrations were conducted. MnTS reactions were conducted to compare the reaction kinetics when raw materials were added to yield from 15% to 20% (i.e., 15-20 weight percent of MnTS in water) MnTS. Theoretical mole ratios=1.05 MnCO$_3$:1.00 SO$_2$:1.20 S. Reaction progress is demonstrated in FIG. 1. When raw materials are increased to a level where the projected product (MnTS) is to have a concentration of 20%, MnTS concentration is only 3% after 2 hours of reaction, as compared to using raw materials at a level where the projected product (MnTS) is to have a concentration of 15% and the MnTS concentration is 10.5% after 2 hours of reaction. Moreover, when raw materials are increased to a level where the projected product (MnTS) is to have a concentration of 20%, after 10 hours the MnTS concentration only reaches 9%. The product of a projected 15% reaction is 15%. This data illustrates the problem encountered when MnTS raw materials are at a level where the corresponding product concentration is too high. There must be an appropriate amount of aqueous solvent present in the reacting mixture to allow the relatively insoluble intermediates to enter solution. Preferably, up to a 17% concentration of MnTS is produced by the process of the invention, and the concentrated can be increased by evaporation of the water solvent. Thus, the invention provides a process to produce MnTS with a preferred concentration of 17-20 wt. %.

Figure 2:
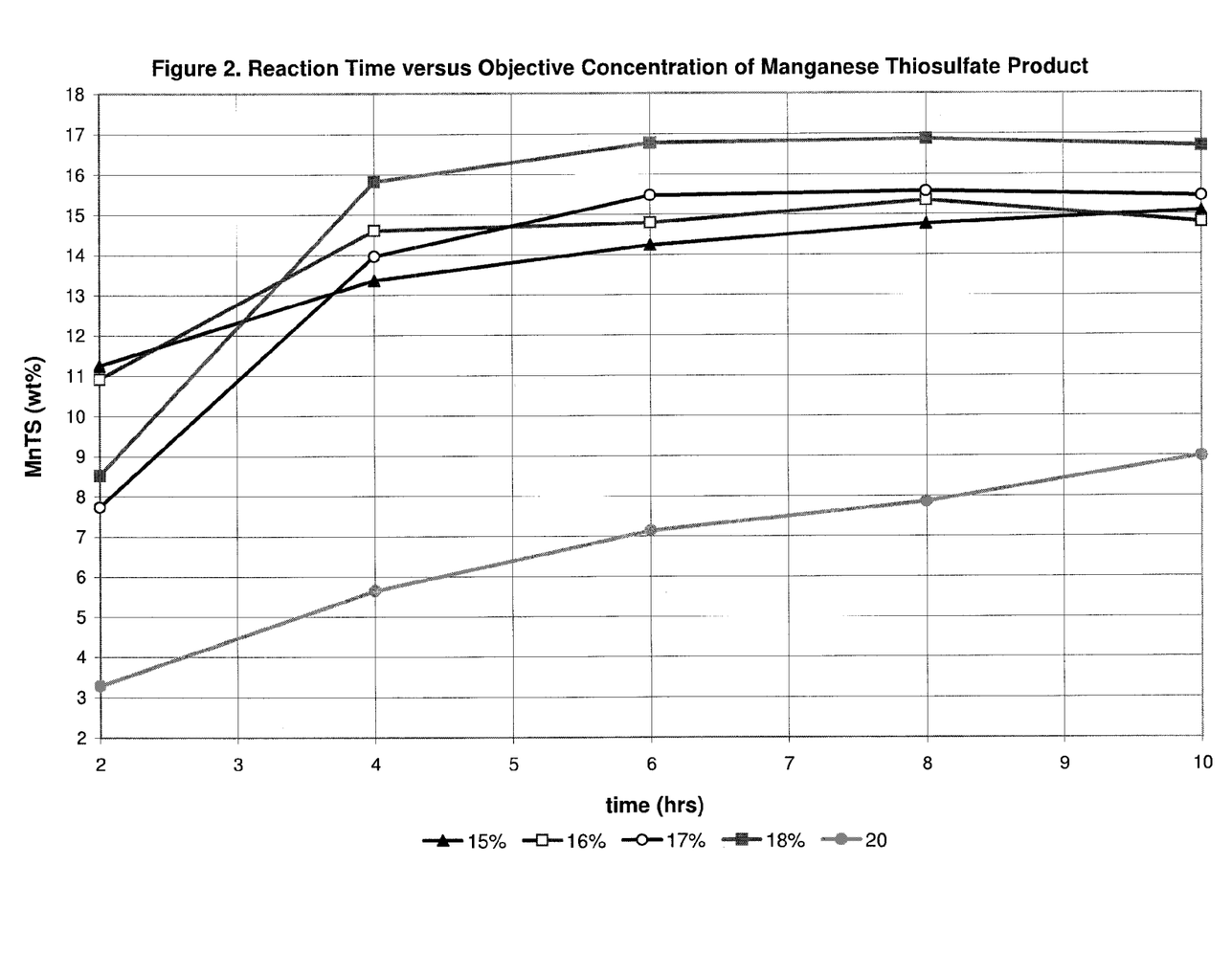
FIG. 2 is a graphical illustration of reaction time versus concentration of manganese thiosulfate product.

A series of reactions were conducted to measure reaction progress over time, as well as residual solid quantities, where raw materials were added consistent with objective concentrations of 15 to 20 wt. % (15, 16, 17, 18 and 20 wt. %) MnTS. The solubility of MnTS has previously been determined to be ~17%. In all cases, reagent grade MnCO$_3$ was prepared as aqueous slurry. The slurry was purged with SO$_2$ until pH was ~2. The resulting product was a thin slurry of manganese hydrosulfite. Sulfur was then added to this intermediate product and heat was applied to attain temperatures of 97-98° C. Mole ratio=1.05:1.00:1.20 MnCO$_3$:SO$_2$:S, where the molar quantity of SO$_2$ is theoretically 1.00 for calculation purposes. Each reaction was conducted for 10 hours. Each progressing product was assayed every 2 hours. Reaction progress, per MnTS assay, is plotted in FIG. 2.

Figure 3:
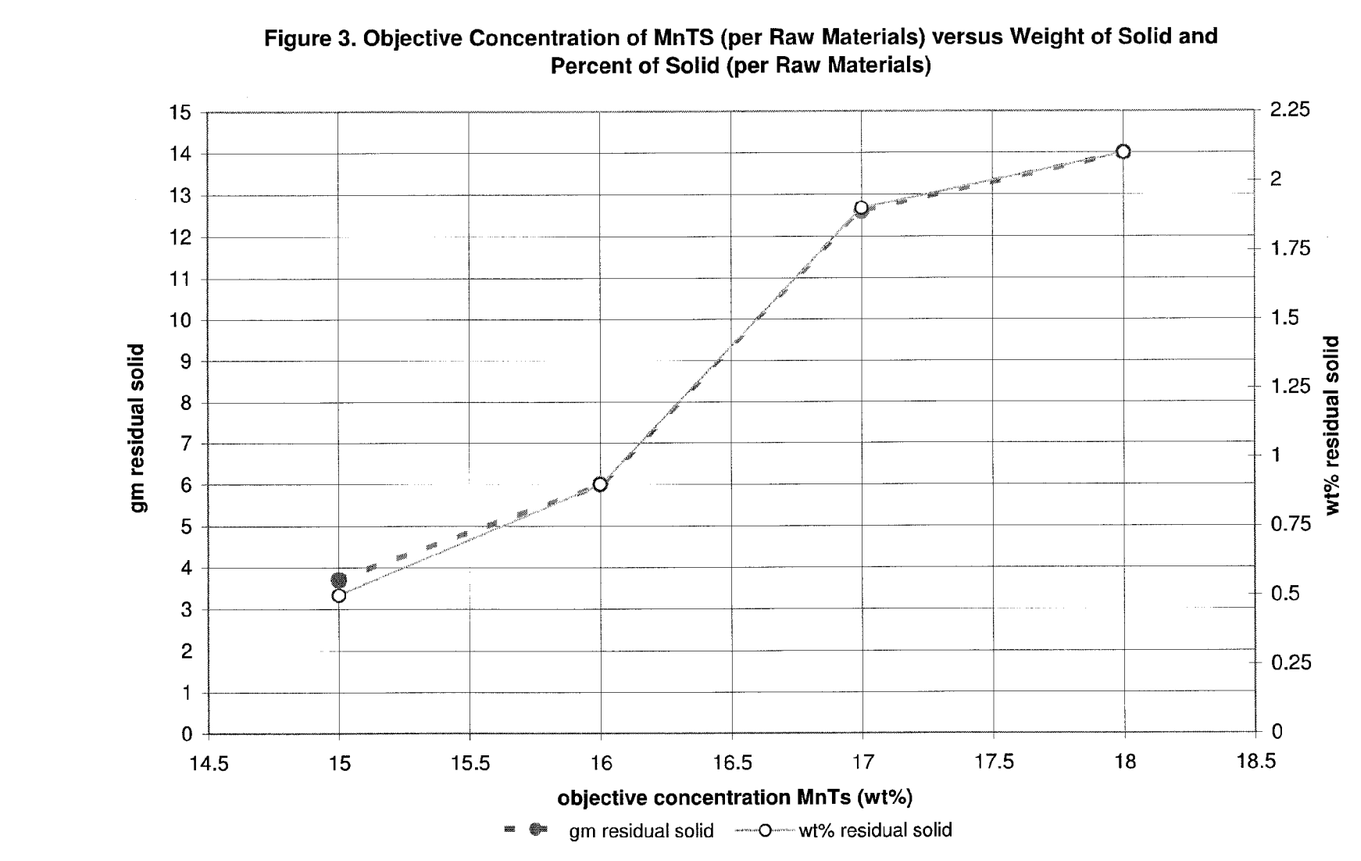
FIG. 3 is a graphical illustration of objective concentration of manganese thiosulfate (per raw materials) versus weight of solid and percent of solid forms (per raw materials)

Measurements indicate that the process is most efficient the first two hours of the reaction. Reaction is complete after 6 hours at 96-99° C. Consistent with solubility studies, MnTS assay does not exceed 17%. The objective assay product, per raw materials added, is only achieved at 15%. The actual weight and the weight percentage of total raw materials remaining as residual solid are charted in FIG. 3. Residual solids range from 4 to 14 gm, for 15-18% objective product reactions, respectively, for ~650 gm of raw materials. The weight percentages of residual solids relative to raw materials range from 0.5 to 2%. 17% MnTS can be produced with minimal loss of raw materials.

The kinetic studies of MnTS reaction were continued at projected concentrations of MnTS comparing sulfur raw materials, i.e., at objective concentrations of each of tire and pure sulfur at 15, 16, 17, 18 and 20 wt. %. Three types of sulfur raw material, purified sulfur, industrial and "tire sulfur" were used. $SO_2$ was purged into $MnCO_3$ slurry until pH was ~2. Sulfur was added to the manganese hydrosulfite, MnHS, intermediate and heated. The MnTS reaction was conducted for 10 hours at 96-99° C., with the product being evaluated every 2 hours. Mole ratio $MnCO_3:SO_2:S=1.05:1.00:1.20$, where the theoretical quantity of $SO_2$ was based on stoichiometry. Comparative reaction kinetics, expressed as % MnTS in the product solution, appears in FIG. 4 for reactions using tire sulfur and purified sulfur as raw material, and in FIG. 5 for reactions using tire sulfur and industrial sulfur. The term "tire sulfur" refers to sulfur that is recovered from used tires, typically via burning the used tires and recover sulfur therefrom. The term "purified sulfur" refers to reagent grade sulfur, and the term "industrial sulfur" refers to the type of sulfur commonly used from a refinery source and used in industry as raw material. It has been determined that tire sulfur tends to react faster and provide a lower level of residuals (by-products), as compared with industrial sulfur.

Figure 4:
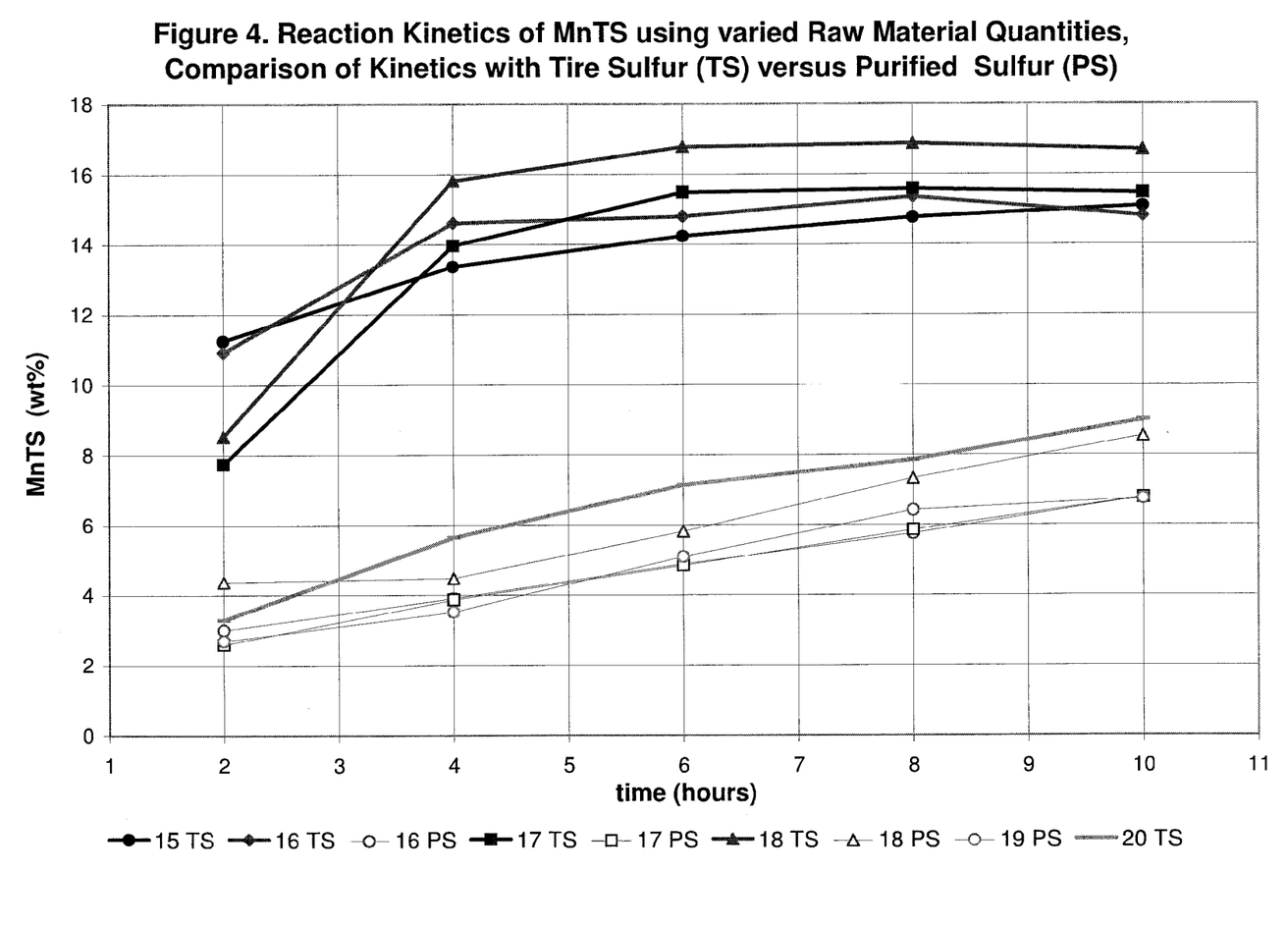
FIG. 4 is a graphical illustration of kinetics of manganese thiosulfate reaction using varied raw material quantities, and comparison of kinetics using tire sulfur (TS) versus purified sulfur (PS)
Figure 5:
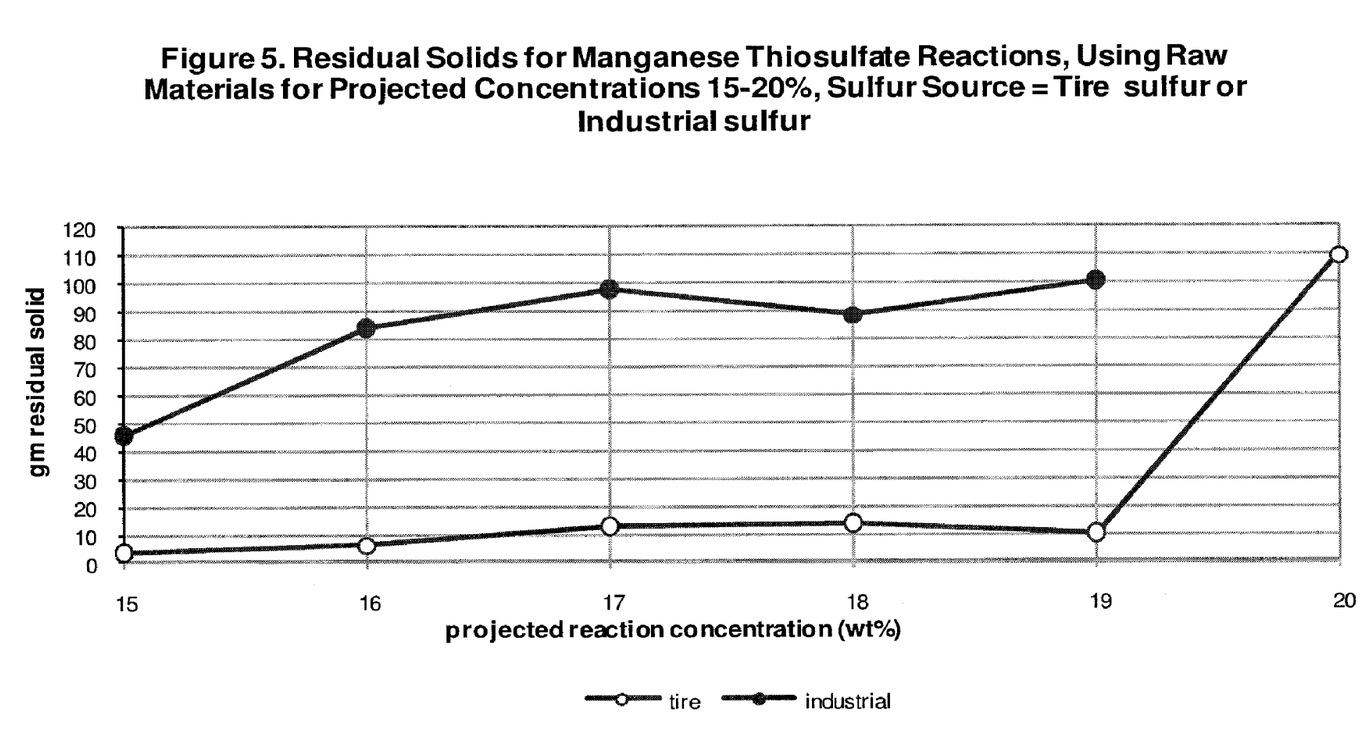
FIG. 5 is a graphical illustration of residual solid for manganese thiosulfate reaction, using raw materials for projected concentrations of 15-20%, sulfur source is tire sulfur (TS) or industrial sulfur.

Based on final product concentration, optimal reaction kinetics was achieved when raw materials were consistent with a 19% MnTS product. The best concentration attained, in the 19% reaction, was 17.9% MnTS. Reaction was essentially finished after 6 hours of reaction. FIGS. 4 and 5 show the effects of sulfur raw material, purified sulfur, industrial sulfur, and tire sulfur, on reaction kinetics and residual (by-product) formation.

With the exception of the reaction conducted using raw materials consistent with 20% product, reaction progress was more than doubled, in efficiency, when tire sulfur was used as sulfur raw material.

FIG. 5 illustrates the residual solid (by-product) quantities that were recovered in each reaction.

Consistent with assay, residual solid was negligible using raw materials for projected concentration up through 19% MnTS, when tire sulfur was used as sulfur raw material. (Residual ranged from 0.6 to 2.1% of raw materials.) When purified sulfur was used for the same projected concentrations of product, residual solids ranged from 6.9 to 15.3% of raw materials.

A series of reactions was designed to compare the relative kinetics of varying objective product concentrations (15 to 20%, i.e., at 15, 16, 17, 18, 19 and 20 wt. %). Raw materials consisted of reagent grade $MnCO_3$ and $SO_2$ and tire sulfur. $MnCO_3:SO_2:S=1.05:1.00:1.20$, where the concentration of $SO_2$ was based on stiochiometry for determination of the other raw materials. $SO_2$ was purged into $MnCO_3$ slurry until pH was ~2. The MnTS reaction, itself, was conducted for 10 hours at reaction temperatures of 97-98° C. Assay for MnTS versus reaction time is displayed in FIG. 6.

Figure 6:
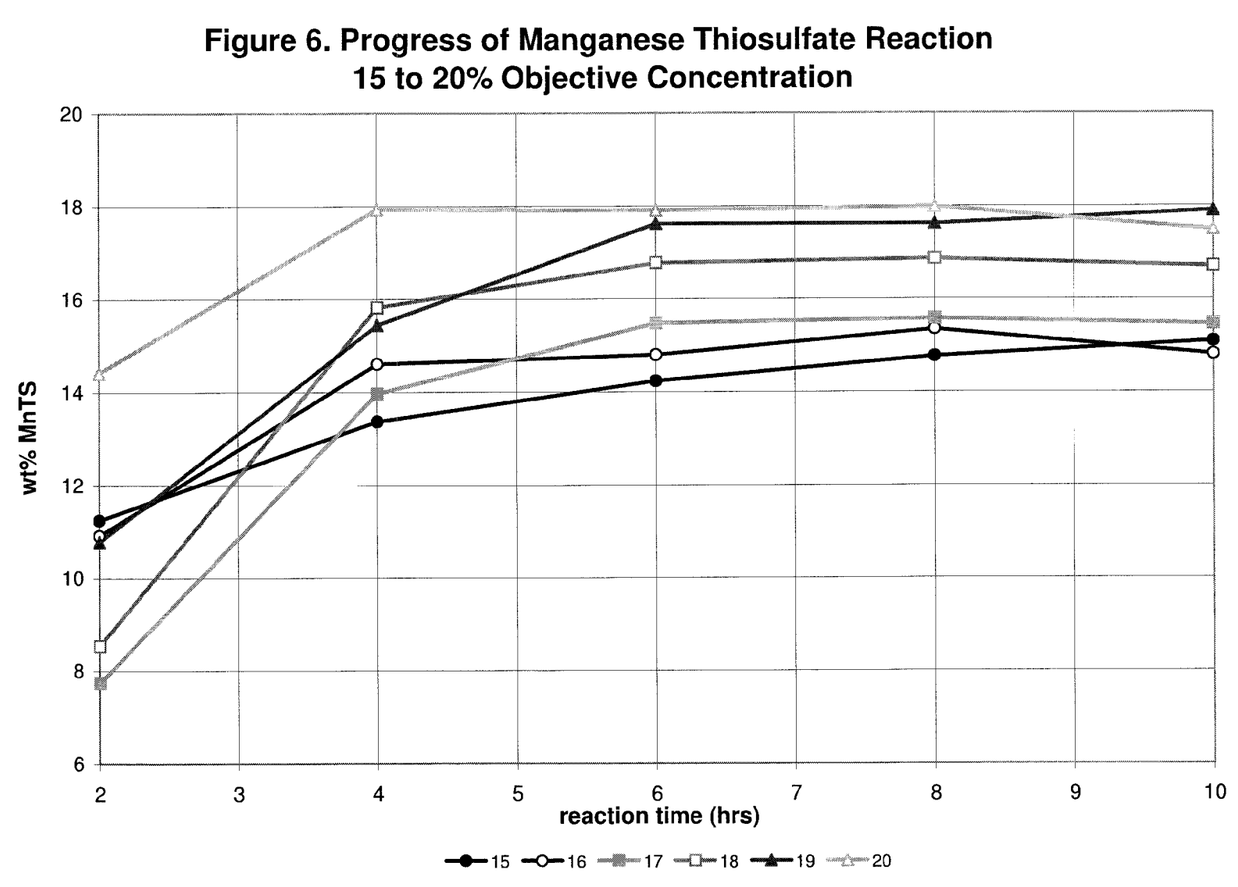
FIG. 6 is a graphical illustration of progress of manganese thiosulfate reaction for projected product concentrations of 15-20%.

Per FIG. 6, both the objective 19% and 20% reactions result in 17-18% MnTS. The objective 20% product reaction, however, was complete after 4 hours, while the objective 19% product reaction was complete only after 6 hours.

Figure 7:
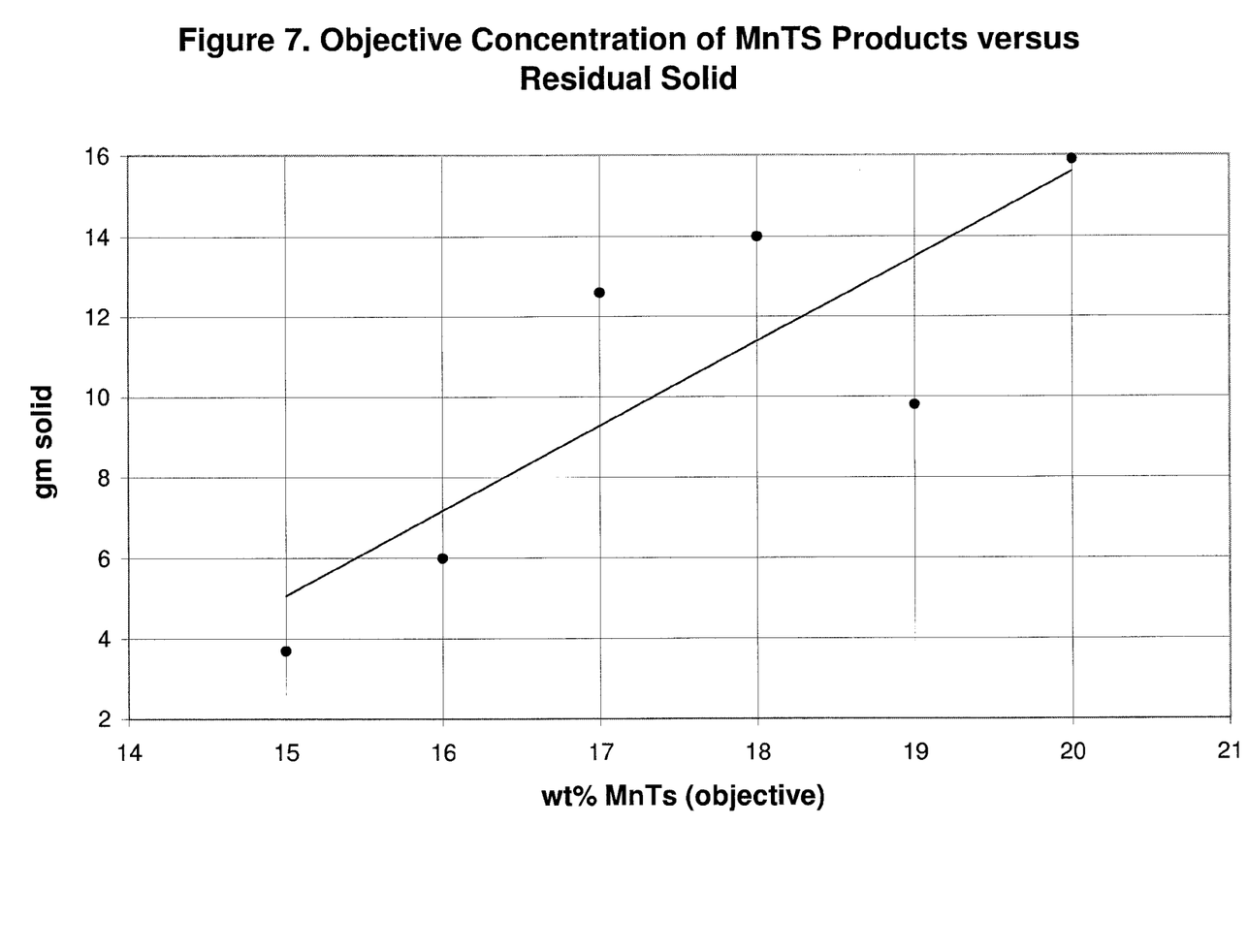
FIG. 7 is a graphical illustration of manganese thiosulfate objective reaction product concentration versus residual solid.

In FIG. 7, objective MnTS concentration is plotted versus residual solid.

Solid increases as raw material levels increase. Residual solids are the most abundant in the objective 20% reaction. However, even in the 20% reaction, residuals solids are only 2.4% of the raw materials used.

The effect of temperature in the kinetics of the manganese thiosulfate process was investigated as well. The objective product concentration was 20%. However, in this reaction, temperature was 90±2° C. Comparison of the reactions for 20% objective product produced at 97° C. versus 90° C. appears in FIG. 8.

Figure 8:
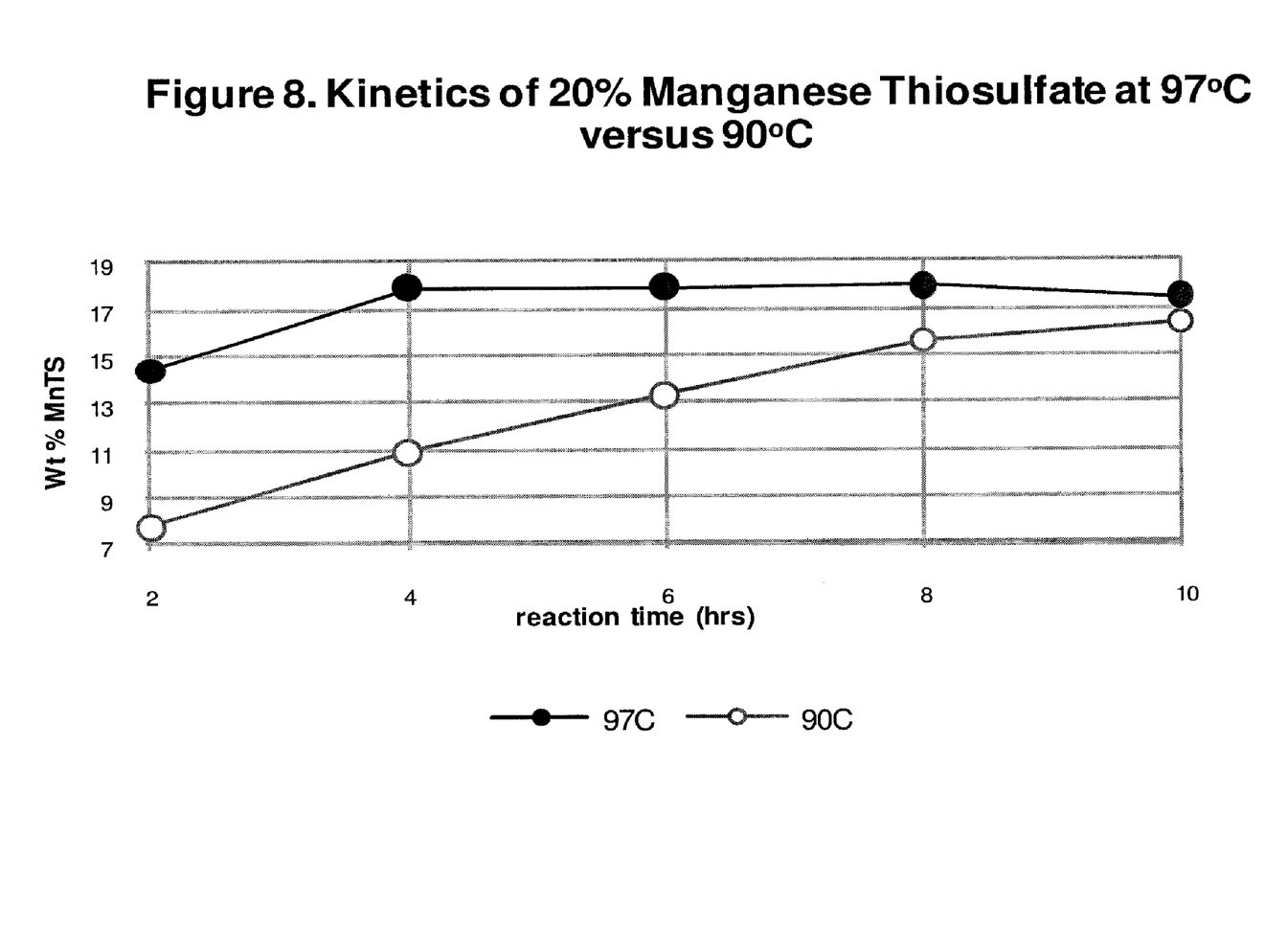
FIG. 8 is a graphical illustration of kinetics of manganese thiosulfate reaction at 97° C. versus 90° C.
Figure 9:
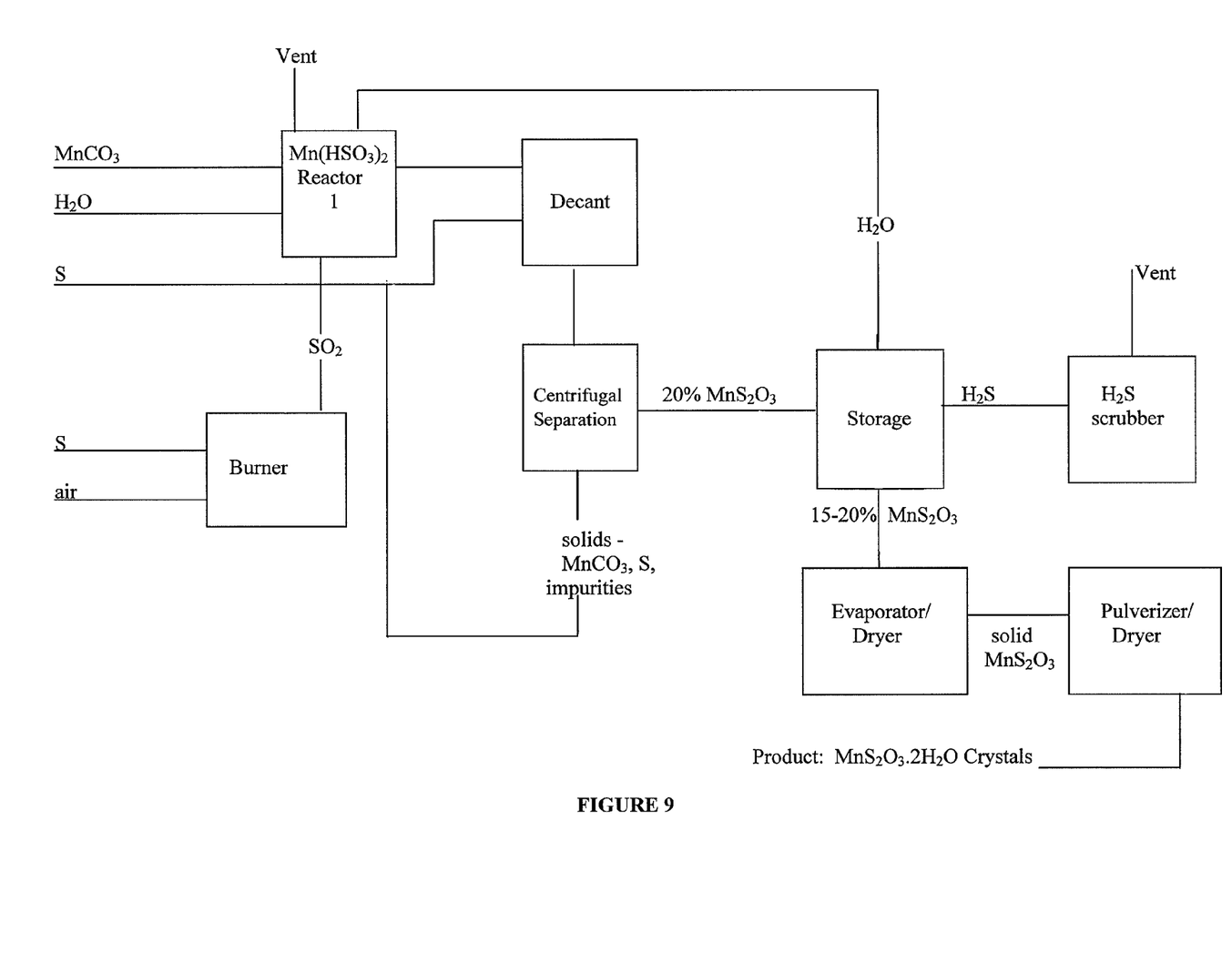
FIG. 9 is a process flow diagram, including a schematic illustration of a process according to one embodiment of the present invention.

MnTS reaction occurred at 90° C., but after 10 hours the reaction was still not complete. The pH also ran lower (3.7-4.3 versus 5.6-6.1), consistent with higher magnesium hydrosulfite levels (0.66 to 2.81% versus 0-0.44%) and no alkalinity (0-0.05% versus 0.09-0.15%) in the reaction conducted at 90° C. Residual solids weighed 14.2 gm, 2.2% of the raw materials used. When reactions were conducted at 97° C., the appearance of the residual solid resembled the manganese raw materials. The residual solid resulting in the reaction conducted at 90° C., by appearance, was all sulfur.

Characterization of solid byproducts from MnTS reactions were determined. Three different solids from MnTS processes were extracted and analyzed. The solids consisted of the typical residual solid of syntheses conducted at 97° C., the sulfur-like residual solid collected from the 90° C. reaction and sediment that appears in MnTS product filtrates where concentration is greater than 17%. The solids were extracted with either 10% HCl in order to assay for $Mn^{++}$ by Atomic Absorption Spectroscopy, DI water to titrate for alkalinity, MnHS and MnTS or $CS_2$ to analyze for free sulfur. Results are outlined in Table 4.

TABLE 4

Analysis of Solids from MnTS Synthesis and Filtrate Sediment

| Solid ID | Typical Residual 97° C. | Residual 90° C. | Filtrate Sediment |
|---|---|---|---|
| % $Mn^{++}$ | 23.4 | 2.0 | 12.8 |
| % Alkalinity as $Mn(OH)_2$ | 0.1 | 0.2 | 0.4 |
| % MnHS | 0 | 0 | 0 |
| % MnTS | 0.2 | 1.4 | 21.2 |
| % S° | 22.1 | 93.3 | — |

In the typical solid, $Mn^{++}$, that is not from MnTS or MnHS, by calculation, and unreacted sulfur are detected. The $Mn^{++}$ is potentially unreacted $MnCO_3$ raw material. The residual from the 90° C. reaction was almost all sulfur. (From the perspective of utilizing the expensive $MnCO_3$ raw material optimally, the lower temperature reaction may be more suitable—at the expense of kinetics.) Finally, the sediment that was removed from 578 gm of MnTS filtrate weighed only 0.26 gm. Based on assay for MnTS, the small amount of sediment appears to be mostly MnTS from over-concentrated solutions. (The solubility of MnTS is 17-18%.)

EXAMPLES

The following examples are provided for illustrative purposes and should not be regarded as limiting the scope of the invention. The example illustrates the preparation of $MnS_2O_3$ solution and solid products. The mole ratios of 1.05:1.00:1.20 $MnCO_3:SO_2:S$ was the basis of the reaction pathways depicted below:

(1)

(2)

Example 1

This example illustrates a one pot reaction synthesizing the intermediate manganese hydrosulfite, $(Mn(HSO_3)_2, MnHS)$ and the subsequent production of manganese thiosulfate, $(MnS_2O_3, MnTS)$ and solid products. Raw materials used were 65.10 gm $MnCO_3$ (99% pure), 499.8 gm $H_2O$ (DI), sufficient $SO_2$ to lower the pH from initial pH of 6.36 to pH of ~1.8. $MnCO_3$ was transferred into a 1000 ml round bottom flask. The prescribed quantity of water was added. The slurry was stirred sufficiently using an overhead stirrer (rod and vertical blade). The slurry product was of moderate thickness and of brownish color.

$SO_2$ was then purged, at a moderate rate of constantly flowing gas bubbles, into the $MnCO_3$ slurry under moderate stirring. The original pH of $MnCO_3$ was 6.36. Enough $SO_2$ was added to lower the pH to about 1.8 pH units. The addition of $SO_2$ was mildly exothermic and the temperature rose from ambient temperature to about 45° C. External heat was applied when the pH reached the prescribed pH unit and 21.37 gm S was added. The reaction mixture was stirred at 90-99° C. (194-210° F.) for 6-10 hrs after which it was cooled and filtered.

The products of this reactions consisted of 570.1 gm of filtrate and 3.7 gm of solid. The filtrate measured 14.89% MnTS, 0.06% alkalinity as $Mn(OH)_2$, Ø MnHS, 4.88% Mn, specific gravity=1.156 @ 24° C. and pH=4.93. The liquid manganese thiosulfate had an eye pleasing pink color.

Example 2

73.77 gm of 99% pure $MnCO_3$ was added to a 1 liter round bottom flask. (Agitation was conducted with a single blade, overhead, stirring apparatus. Heating was accomplished through the use of a heating mantle at the base of the flask.) 498.4 gm of water was then added. 63.4 gm of $SO_2$ was added to the slurry. pH, after $SO_2$ purging, was 2.24. 23.6/gm of tire S was added. Reaction was conducted for 10.5 hours within a temperature range of 97-98° C. The filtrate measured 15.46% MnTS. 579.5 gm of filtrate was recovered, along with 12.6 gm (1.9% of raw materials) residual solids.

Example 3

480.8 gm of pure $MnCO_3$ was added to a 4 liter Ace reactor. (The cylindrical reactor was surrounded by a heating mantle. An overhead, multiple bladed stirrer was used for agitation.) 2576.1 gm of water was added to form slurry. The initial pH of the $MnCO_3$ slurry was 6.9. $SO_2$ was purged into the slurry over 6 hours, to a final pH of 1.98. 154.54 gm of tire S was added. Reaction temperature was brought to 96° C. The reaction temperature was held at 96-99° C. for 4 hours. The filtrate measured 19.6% $MnS_2O_3$.

Example 4

3.45 kg of 96% purity $MnCO_3$ was placed in a 30 liter Ace reactor. (The cylindrical reactor was heated by a heating mantle at its base, as well as a wraparound heating jacket. Stirring was accomplished by an overhead, multiple bladed stirring apparatus.) 24.2 kg of water was added to form slurry. $SO_2$ was slowly added until pH=2.8. Total purging time was 5.5 hours. 1.1 kg of S was added to the $Mn(HSO_3)_2$ intermediate slurry. Heating was conducted for 4 hours within the temperature range of 96-98° C. Final filtrate assay was 15.2% MnTS.

What is claimed:

1. A process for preparing manganese thiosulfate solution comprising:
    (a) providing a manganese carbonate slurry;
    (b) adding sulfur dioxide to the manganese carbonate slurry to form a mixture;
    (c) reacting the mixture to form manganese hydrosulfite slurry;
    (d) adding sulfur to the manganese hydrosulfite slurry, and reacting to form manganese thiosulfate solution; and
    (e) recovering the manganese thiosulfate solution.

2. The process of claim 1, wherein
    steps (b) and (c) further comprise maintaining a pH of about 2 to 3, and
    step (d) further comprises maintaining a pH of about 4 to 6.

3. The process of claim 1 wherein step (b) further comprises adding the sulfur dioxide to the manganese carbonate slurry until a pH of about 2 to 3 is attained.

4. The process of claim 1 further comprising an initial step of preparing the manganese carbonate slurry by combining manganese carbonate and water.

5. The process of claim 3 wherein step (b) occurs without external heating.

6. The process of claim 3 wherein step (d) further comprises heating the manganese hydrosulfite slurry.

7. The process of claim 6 wherein step (d) further comprises heating the manganese hydrosulfite slurry to maintain a temperature of at least about 90° C.

8. The process of claim 7 wherein step (d) further comprises heating the manganese hydrosulfite slurry to maintain a temperature of about 96 to about 99° C.

9. The process of claim 1 wherein step (b) further comprises combining manganese carbonate and sulfur dioxide at a manganese carbonate to sulfur dioxide mole ratio of about 1.00:1.00 to 1.10:1.00.

10. The process of claim 9 wherein step (d) further comprises adding sulfur to the manganese hydrosulfite slurry at a sulfur to manganese hydrosulfite ratio of from 1.0:1.0 to 1.2:1.0.

11. The process of claim 1 wherein step (d) further comprises adding sulfur selected from the group consisting of pure sulfur and tire sulfur.

12. The process of claim 1 wherein the mole ratio of manganese carbonate to sulfur dioxide to sulfur used is 1:05:1.00:1.20.

13. The process of claim 1 wherein
    step (d) further comprises production of by-product waste comprising manganese carbonate and sulfur, and
    step (e) further comprises recovery of each of the by-product waste manganese carbonate and sulfur.

14. A process for preparing manganese thiosulfate comprising:
    (a) providing a manganese carbonate slurry;
    (b) purging sulfur dioxide into the manganese carbonate slurry to attain a pH of about 2 to about 3, to produce a slurry mixture of manganese hydrosulfite and manganese carbonate;
    (c) heating the slurry mixture produced in step (b) to a temperature of about 96 to about 99° C. at a pH of about 4 to about 6, to form manganese thio sulfate; and
    (d) recovering the manganese thiosulfate produced in step (c).

15. The process of claim 14, wherein the mole ratio of manganese carbonate to sulfur dioxide to sulfur used is 1:05:1.00:1.20.

16. The process of claim 15, wherein step (c) further comprises production of by-product waste comprising manganese carbonate and sulfur, and wherein step (d) further comprises recovery of each of the by-product waste manganese carbonate and sulfur.

* * * * *